L. P. DAUB.
METHOD OF MAKING FUSIBLE WIRE.
APPLICATION FILED OCT. 20, 1910.
1,013,864.
Patented Jan. 9, 1912.
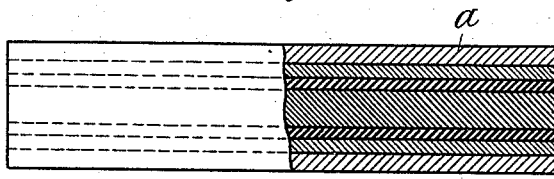 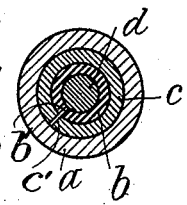
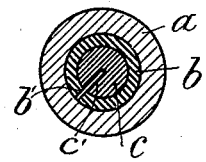
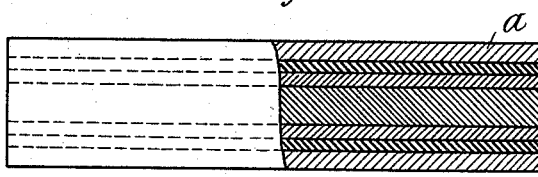 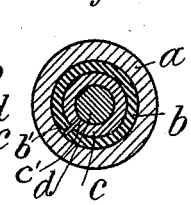
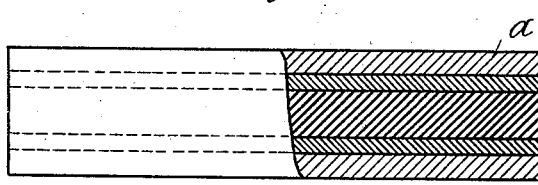 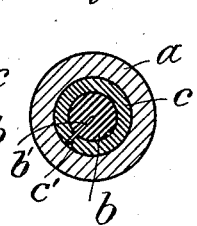
Witnesses.
Inventor.
Ludwig Philipp Daub.
COLUMBIA PLANOGRAPH CO., WASHINGTON, D. C.

UNITED STATES PATENT OFFICE.

LUDWIG PHILIPP DAUB, OF PFORZHEIM, GERMANY.

METHOD OF MAKING FUSIBLE WIRE.

1,013,864. Specification of Letters Patent. Patented Jan. 9, 1912.

Application filed October 20, 1910. Serial No. 588,044.

*To all whom it may concern:*

Be it known that I, LUDWIG PHILIPP DAUB, a subject of the Grand Duke of Baden, residing at Pforzheim, Germany, have invented an Improved Method of Making Fusible Wire, of which the following is a specification.

This invention relates to an improved method of making a fusible wire composed of a plurality of concentric layers, and used in the manufacture of chains or other articles of jewelry.

The object of the invention is to produce a wire in which the fusing agent or solder is uniformly distributed and of such a thickness only as is necessary to effect a union of the wire-ends, so that an objectionable overflow of the solder during the soldering operation is prevented.

In carrying out the invention, the solder is by fusing or welding intimately secured to a sheet metal plate that thus constitutes a carrier for the solder, and is of a ductility that permits it to be readily expanded during the wire drawing operation.

In the accompanying drawing: Figure 1 is an enlarged longitudinal section of a soldering wire embodying my invention; Fig. 2 a cross section thereof; Fig. 3 a detail of the carrier and solder layer; Fig. 4 a cross section of a modification of the wire; Fig. 5 a longitudinal section of a further modification; Fig. 6 a cross section of Fig. 5; Fig. 7 a longitudinal section of a further modification, and Fig. 8 a cross section of Fig. 7.

In carrying out my invention, there is applied to a sheet metal plate or carrier $b$ a layer of solder $c$ (Fig. 3) either by fusing or welding. For fusing, the solder together with the carrier are heated within a mold until the solder is evenly distributed over the carrier and becomes united therewith. For welding, the carrier together with a sheet of solder, are placed between two plates, and heated under pressure to a red heat, under exclusion of air, the heat being below the melting point of the solder.

The compound sheet thus formed is rolled in a cold state into a plate having the thinness desired and is then cut up into narrow strips each of which is bent into tubular form with its longitudinal edges abutting against each other as at $b'$, $c'$. The tube is next inserted into a tubular shell $a$ constituting the facing, while a core $d$ is introduced into the hollow of the tube. After the parts have been assembled in the manner described, the product is drawn out in a cold state into a wire and may finally be annealed if desired.

In Fig. 4, the core $d$ is omitted and the carrier $c$ itself together with the surrounding sheet $b$ constitutes a cylindrical core surrounded by shell $a$.

In Figs. 5 and 6 the position of carrier $b$ and solder sheet $c$ is the reverse of that shown in Figs. 1 and 2, the sequence being core $d$, solder sheet $c$, carrier $b$ and shell $a$.

In Figs. 7 and 8 the position of the carrier $b$ and solder sheet $c$ is the reverse of that shown in Fig. 4, the sequence being core-forming carrier $b$, solder sheet $c$ and shell $a$.

By the method described the soldering film embodied in the wire is of such a thinness as to provide just sufficient substance for uniting abutting wire ends in the formation of chain links and similar articles without causing an overflow of the solder when the link is subjected to heat. In this way any undue withdrawal of the solder which would lead to the formation of objectionable cavities below the shell is obviated.

I claim:

1. Method of making a solderable wire which consists in bending a compound strip composed of a sheet metal carrier and a solder film into cylindrical form, sliding it into a metal shell and drawing the resulting product into a wire.

2. Method of making a solderable wire which consists in intimately uniting a sheet metal carrier with a solder film, reducing the thickness of the compound sheet thus formed by rolling, cutting the rolled sheet up into strips, bending each strip into a cylindrical form, inserting it into a shell, and drawing the resulting product into a wire.

3. Method of making a solderable wire which consists in intimately uniting a sheet metal carrier with a solder film, reducing the thickness of the compound sheet thus formed by rolling, cutting the rolled sheet up into strips, bending each strip into a tubular form, inserting it into a shell, introducing a metal core into the tube, and drawing the resulting product into a wire.

This specification signed and witnessed this 7th day of October 1910.

LUDWIG PHILIPP DAUB.

Witnesses:
N. R. SHANK,
A. O. TITTMAN.